United States Patent [19]

Kikuchi

[11] 4,320,006

[45] Mar. 16, 1982

[54] CENTRIFUGAL OIL SEPARATOR

[75] Inventor: Takefusa Kikuchi, Musashino, Japan

[73] Assignee: Taiyu Shoji Kabushiki Kaisha, Tokyo, Japan

[21] Appl. No.: 111,110

[22] Filed: Jan. 10, 1980

[30] Foreign Application Priority Data

Jan. 16, 1979 [JP] Japan .............................. 54/3505[U]

[51] Int. Cl.³ .......................... B04B 3/00; B01D 33/10

[52] U.S. Cl. .................................... 210/369; 210/377; 210/380.1

[58] Field of Search ............... 210/380.1, 380.2, 380.3, 210/381, 382, 369, 372, 373, 374, 375, 376, 377

[56] References Cited

U.S. PATENT DOCUMENTS

| | | | |
|---|---|---|---|
| 1,146,438 | 7/1915 | Murphy | 210/380.1 |
| 2,206,204 | 7/1940 | Richli | 210/380.1 |
| 2,321,207 | 6/1943 | Howe | 210/380.1 |
| 2,422,464 | 6/1947 | Bartholomew | 210/380.1 |
| 3,425,561 | 2/1969 | Steele | 210/380.1 |
| 3,453,083 | 7/1969 | Beerli | 210/380.1 |
| 3,491,888 | 1/1970 | Colburn | 210/380.1 |
| 3,552,575 | 1/1971 | Hultsch | 210/380.1 |
| 3,955,754 | 5/1976 | Schaper | 210/380.1 |
| 3,994,809 | 11/1976 | Rhodes | 210/380.1 |
| 4,253,960 | 3/1981 | Dudley | 210/380.1 |

*Primary Examiner*—Ernest G. Therkorn
*Attorney, Agent, or Firm*—Price, Heneveld, Huizenga & Cooper

[57] ABSTRACT

Bowl shaped basket with a vertical rotating axle at the outside bottom center, equipped with a chip charging pipe, whose charging mouth opens within and at the basket bottom center with a gap, the inner surface of the bowl is so formed that the angle between the tangent to the surface and the rotating axis decreases as the diameter of the bowl, until to almost zero, or even minus at the brim.

The time, oil wet chip is dispersed off out of the upper brim, can be taken as long enough, inversely as the rate of chips discharging.

The basket is composed of rings each with a quadrilateral or trapezoidal section and of successibly increasing diameters, spot welded together one by one with a outwards divergent slit.

The slit is never blocked by chips, and if chips might happen to block the entrance of the slit within the bowl, they can easily be taken off.

1 Claim, 2 Drawing Figures

CENTRIFUGAL OIL SEPARATOR

Figure 1:
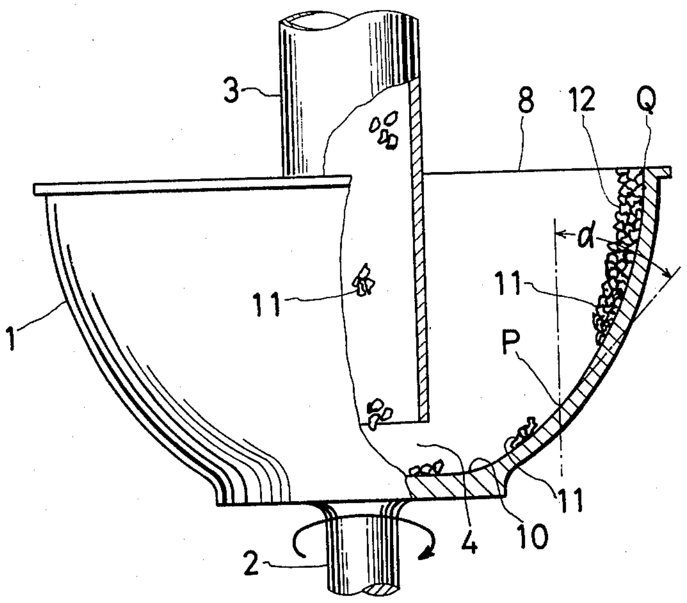

This invention relates to an improvement of the conventional oil separating apparatus, equipped with an oil separating basket of a conical shape, rotating around a vertical axle, to separate the adhering cutting oil, by the centrifugal method, off the milled or hobbed chips or the like, as produced during the machining operation by milling or hobbing machines.

As explained later the ideal shape of the basket should be of a bowl, with a revolving surface, generated by an ideal curve, functioned by the revolution speed and the coefficient of friction between the bowl and the chips, while the oil separating basket of the conventional oil separator, being made of gauze or multi-drilled plate, its shape is inevitably of an inverted cone, whose generating line, being a straight line, and making a fixed angle to the rotating axle.

The basic idea of this kind of a centrifugal oil separator is to disperse the adhering cutting oil by the centrifugal force, off the oil wet chips, charged into the basket, possibly at its rotating centre, either continuously or intermittently, and to discharge thus processed chips off the basket along its brim.

In such a system, the cone angle of the basket ought to be not less than the friction angle between the chips and the basket wall.

Now, when oil wet chips are charged into such a rotating basket, they are centrifugally spread outwards along the bottom up to the bottom of the coned wall of the basket, and the adhering cutting oil begins to be dispersed off the chips and out of the basket through the gauze or multi-drilled holes.

In order that thus processed chips are automatically conveyed upwards up to the basket brim, the component of the centrifugal force to shift the chips upwards must be larger than the frictional resistance due to the component of the centrifugal force.

Now, as soon as the chips are thus shifted upwards, components of the centrifugal force, acting on the oil wet chips, becomes greater, and oil dispersing becomes more effective, but at the same time, the chip shifting force and consequently the shifting speed increases. This action rapidly increases as the chips are shifted upwards, till at last, they are too rapidly to the brim of the basket, without enough time to be disoiled. Ideally, therefore, in order that the disoiling process is ideally and successfully operated, the charged oil wet chips may remain long enough within the revolving basket, so that the chips may have enough time to be disoiled, and then thus the disoiled chips are successibly and gradually dispersed away along the brim of the revolving basket.

To realize ideally this function, the shape of the basket should be of a bowl, with a revolving surface, generated by a curve, the angle of its tangent to the revolving axis being maximum at its bottom, gradually decreasing along the wall until to almost zero or even minus at the brim of the bowl.

This invention eliminates not only the defect of the conventional and successfully attains the ideal oil separation, but also offers an easy manufacture and maintenance.

The invention is illustrated in the accompanying drawings, wherein:

FIG. 1 is the sectional side elevation

Figure 2:
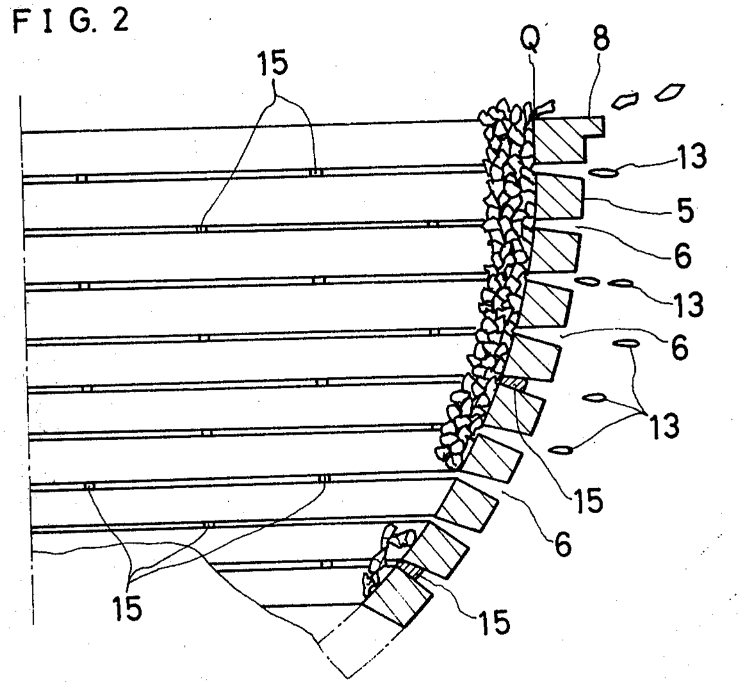

FIG. 2 is the FIG. 1 partially enlarged, where, (1) Bowl shaped basket
(2) Vertical axle
(3) Chip charging pipe
(4) Gap between the clip charging pipe end and the bowl bottom
(5) Ring element of the bowl
(6) Slit between rings
(8) Brim of basket
(10) Bottom of basket
(11) Chips
(12) Layer of chips
(13) Dispersed oil
(15) Welded spot The basket (1), which is aligned to revolve around a vertical axle (2) is composed of rings, with a quadrilateral or trapezoidal cross section and of a respective diameter, concentrically arranged and spot welded together at several points (15), to have a circumferential and outward divergent slit (6) between each other, and spot welded with each other at several points (15).

The inner surface of thus constructed bowl is so formed that the inclination $\alpha$ of the tangent at any point P against its rotating axis, is larger a little than the friction angle between the surface and the wet chips, being maximum at the bottom of bowl, where the centrifugal force gradually and inversely decreasing as the diameter of the bowl, until to almost zero, or even minus at the brim Q of the bowl as already mentioned and as illustrated in the figure.

Within the bowl (1) and along its rotating axle, the oil wet chip charging pipe (3) is equipped to have a gap (4) between the pipe end and the bowl bottom.

Thus, the chips (11), charged through the pipe (3) centrifugally spread towards along the bottom (10) of the bowl and then further are conveyed upwards along the inside surface of the bowl, until they accumulate along the upper part of the bowl to make a chip layer (12).

The upper part near the brim (8) of the bowl, where the inclination $\alpha$ of the curve against the revolving axis is made so small or sometimes negative, the upper part of the chips layer (12) would not be shifted upwards. As long as the adhering resistance due to the centrifugal force of the upper part of the layer against the wall, is less or balances to the upwards shifting force, acting on the lower part of the layer (12). But the upwards shifting force successibly increases, because the lower part of the layer is continuously enlarged by the upward shifted chips along the wall, these two forces loose their balance, and the upper part of the layer (12) as is pushed upwards, to be dispersed at the brim (8). Thus the upper part of the chip layer, where the centrifugal force to disperse the wet oil off the chips is maximum, has enough time to be effectively disoiled.

Thus, the time, since after an oil wet chip (11) reaches the lowest part of chips layer (12), being driven upwards, until it is dispersed off out of the upper brim (8), can be taken as long enough, inversely as the rate of chips discharging. During this time, the adhering cutting oil (13) of the chips, is effectively dispersed through the slits (6) of the bowl, and the disoiled chips, off the brim of basket, and the oil and chips thus dispersed are separately collected by respective apparatus (not illustrated).

The basket (1), being composed of rings (5) with a quadrilateral or trapezoidal section of different diameter, concentrically aligned and spot welded together one by one with a slit (6) between each other, the basket (1) can be easily constructed to form a bowl, which is difficult in case of conventional basket, made of gauze or multidrilled plate.

Moreover, the slits between rings, being of a ring form, every chip crosses the ring slit, and the separated oil (13) in every ring, never fails to be dispersed off out of the slit.

The slit (6), being divergent outwards because of the square or trapezoidal section, are never blocked by chips, and if chips might happen to block the entrance of the slit within the bowl, they can easily be taken off.

(1) Bowl shaped basket with a vertical rotating axle (2) at the outside bottom centre, equipped with a chip charging pipe, whose charging mouth opens within and at the basket bottom centre with a gap (4), the inner surface of the bowl is so formed that the angle between the tangent to the surface and the rotating axis decreases as the diameter of the bowl, until to almost zero, or even minus at the brim Q.

(2) The basket as above described, composed of rings each with a quadrilateral or trapezoidal section and of successibly increasing diameters, spot welded together one by one with a outwards divergent slit.

What is claimed is:

1. A centrifugal separator for separating the oil from oil coated chips comprising: a bowl shaped basket and means supporting said basket for rotation about a central vertical axis; a pipe for charging said basket with chips, said pipe being centered about the axis of rotation of said basket and extending into said basket to a point adjacent to and spaced from the bottom thereof; the inner surface of said basket being smoothly and upwardly curved such that the angle formed between the axis of rotation and the tangent of the surface progressively decreases as the diameter of the basket increases until the angle is or is nearly zero; the walls of the basket being formed by rings each having a trapezoidal cross-sectional shape; from the bottom to the top of said basket, said rings being of a progressively increasing diameter, said rings being vertically spaced to form a plurality of circumferential slits whereby all of the chips as they move up the sides of the basket must cross each of the slits in succession; said slits being of radially increasing width with the inner ends of said slits being narrower than said chips; said rings being joined to each other by welding at circumferentially spaced intervals.

* * * * *